(12) United States Patent
Whittle

(10) Patent No.: US 11,047,247 B2
(45) Date of Patent: *Jun. 29, 2021

(54) TURBINE SECTION OF A GAS TURBINE ENGINE WITH CERAMIC MATRIX COMPOSITE VANES

(71) Applicant: Rolls-Royce plc, London (GB)

(72) Inventor: Michael J. Whittle, London (GB)

(73) Assignee: Rolls-Royce plc

( * ) Notice: Subject to any disclaimer, the term of this patent is extended or adjusted under 35 U.S.C. 154(b) by 112 days.

This patent is subject to a terminal disclaimer.

(21) Appl. No.: 16/229,757

(22) Filed: Dec. 21, 2018

(65) Prior Publication Data

US 2020/0200024 A1 Jun. 25, 2020

(51) Int. Cl.
  *F01D 9/04* (2006.01)
  *F01D 5/28* (2006.01)
  *F01D 25/24* (2006.01)

(52) U.S. Cl.
  CPC .......... *F01D 9/042* (2013.01); *F01D 5/282* (2013.01); *F01D 9/041* (2013.01); *F01D 25/24* (2013.01); *F05D 2240/12* (2013.01); *F05D 2240/14* (2013.01); *F05D 2260/30* (2013.01); *F05D 2300/6033* (2013.01)

(58) Field of Classification Search
  None
  See application file for complete search history.

(56) References Cited

U.S. PATENT DOCUMENTS

| | | |
|---|---|---|
| 6,164,903 A | 12/2000 | Kouris |
| 6,290,464 B1 * | 9/2001 | Negulescu ............... F01D 1/32 416/97 R |
| 6,325,593 B1 | 12/2001 | Darkins, Jr. et al. |
| 6,514,046 B1 | 2/2003 | Morrison et al. |
| 6,558,114 B1 | 5/2003 | Tapley et al. |
| 6,648,597 B1 | 11/2003 | Widrig et al. |
| 6,860,716 B2 | 3/2005 | Czachor et al. |
| 6,884,030 B2 | 4/2005 | Darkins, Jr. et al. |
| 7,114,917 B2 | 10/2006 | Legg |
| 7,670,116 B1 | 3/2010 | Wilson, Jr. et al. |
| 7,762,766 B2 | 7/2010 | Shteyman et al. |
| 8,206,098 B2 * | 6/2012 | Prill ...................... F01D 5/284 415/200 |
| 8,292,580 B2 * | 10/2012 | Schiavo .................. F01D 5/189 416/229 A |
| 8,454,303 B2 | 6/2013 | Garcia-Crespo |
| 8,956,105 B2 * | 2/2015 | Uskert ................... F01D 5/282 415/116 |
| 9,097,141 B2 | 8/2015 | Paradis |

(Continued)

FOREIGN PATENT DOCUMENTS

JP 63223302 A 9/1988

OTHER PUBLICATIONS

European Search Report for Application No. 19214138.0-1004, dated May 25, 2020, 9 pages.

*Primary Examiner* — Michael Lebentritt
*Assistant Examiner* — Jason G Davis
(74) *Attorney, Agent, or Firm* — Barnes & Thornburg LLP

(57) ABSTRACT

A turbine section for use in gas turbine engine includes a turbine case, a plurality of gas path components, a vane mount unit, and an inner vane static seal assembly. The turbine vane comprising ceramic matrix composite materials to insulate the metallic materials of the vane mount unit.

18 Claims, 2 Drawing Sheets

(56) References Cited

U.S. PATENT DOCUMENTS

| | | | |
|---|---|---|---|
| 9,546,557 B2 | 1/2017 | Grooms, III et al. | |
| 9,915,159 B2 | 3/2018 | Huizenga et al. | |
| 10,094,239 B2 | 10/2018 | Freeman et al. | |
| 10,174,627 B2 | 1/2019 | Chang et al. | |
| 10,233,764 B2* | 3/2019 | Thomas | F01D 11/005 |
| 10,378,372 B2* | 8/2019 | Negulescu | F01D 25/24 |
| 10,612,399 B2* | 4/2020 | Freeman | F01D 9/041 |
| 2014/0001285 A1 | 1/2014 | Grooms, III et al. | |
| 2014/0234118 A1 | 8/2014 | Beaujard et al. | |
| 2014/0255174 A1 | 9/2014 | Duelm et al. | |
| 2016/0003072 A1 | 1/2016 | Chang et al. | |
| 2016/0076390 A1* | 3/2016 | Marmilic | F01D 9/041 |
| | | | 415/116 |
| 2016/0084096 A1 | 3/2016 | Carr et al. | |
| 2016/0123163 A1 | 5/2016 | Freeman et al. | |
| 2016/0123164 A1 | 5/2016 | Freeman et al. | |
| 2016/0177761 A1 | 6/2016 | Huizenga et al. | |
| 2016/0201488 A1 | 7/2016 | Carr et al. | |
| 2017/0022833 A1 | 1/2017 | Heitman et al. | |
| 2017/0051619 A1 | 2/2017 | Tuertscher | |
| 2018/0017074 A1 | 1/2018 | Shanti et al. | |
| 2018/0045117 A1 | 2/2018 | Groves, II et al. | |
| 2018/0223680 A1 | 8/2018 | Hafner | |
| 2018/0238181 A1 | 8/2018 | Reynolds et al. | |
| 2018/0238184 A1 | 8/2018 | Reynolds et al. | |
| 2018/0328187 A1 | 11/2018 | Oke | |
| 2018/0340431 A1 | 11/2018 | Kerns et al. | |
| 2018/0370158 A1 | 12/2018 | Gather et al. | |

* cited by examiner

TURBINE SECTION OF A GAS TURBINE ENGINE WITH CERAMIC MATRIX COMPOSITE VANES

FIELD OF THE DISCLOSURE

The present disclosure relates generally to gas turbine engines, and more specifically to turbine sections of such engines—especially those with ceramic matrix composite vanes.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The static vane assemblies include fixed airfoils that smooth and redirect air moving through the turbine. The rotating wheel assemblies include disks carrying blades around their outer edges.

Some turbines are now being designed to include components made from ceramic matrix composite materials. Ceramic matrix composite materials can generally withstand higher temperatures than current metallic materials. Use of ceramic matrix composite materials can allow for increased temperatures within the turbine and/or decreased cooling air use in the turbine such that the overall efficiency of the turbine can be improved. Accordingly, further development of designs incorporating ceramic matrix composite materials is of interest.

SUMMARY

The present disclosure may comprise one or more of the following features and combinations thereof.

A turbine section of a gas turbine engine according to the present application can include a turbine case, a turbine vane, and a vane mount unit for coupling the turbine vane to the turbine case. The turbine case extends around a central reference axis and may be made from metallic materials. The turbine vane includes an outer end wall, an inner end wall, and an airfoil that extends from the outer end wall to the inner end wall through a primary gas path of the turbine section.

In illustrative embodiments, the turbine vane may be made from ceramic matrix composite materials adapted for use in high-temperature environments. The vane mount unit that couples the turbine vane to the turbine case can include (i) a spar made from metallic materials that extends radially through the airfoil of the turbine vane and that is configured to receive loads from the airfoil during use of the turbine section in the gas turbine engine and (ii) a carrier made from metallic materials that is coupled to the spar and engages the turbine case at two axially separated locations to carry loads from the spar to the turbine case and anchor the turbine vane relative to the turbine case.

In illustrative embodiments, the turbine section may further include an inner vane static seal assembly located radially inward of the primary gas path of the turbine section that divides pressure cavities within the turbine section. The inner vane static seal assembly may be coupled to a radially-inner end of the spar so as to be coupled to the turbine case via the vane mount unit. This arrangement allows loads applied to the inner vane static seal assembly to be carried to the turbine case while in-part or in-whole avoiding the turbine vane so as to manage loading through the turbine vane.

These and other features of the present disclosure will become more apparent from the following description of the illustrative embodiments.

DETAILED DESCRIPTION OF THE DRAWINGS

Figure 1:
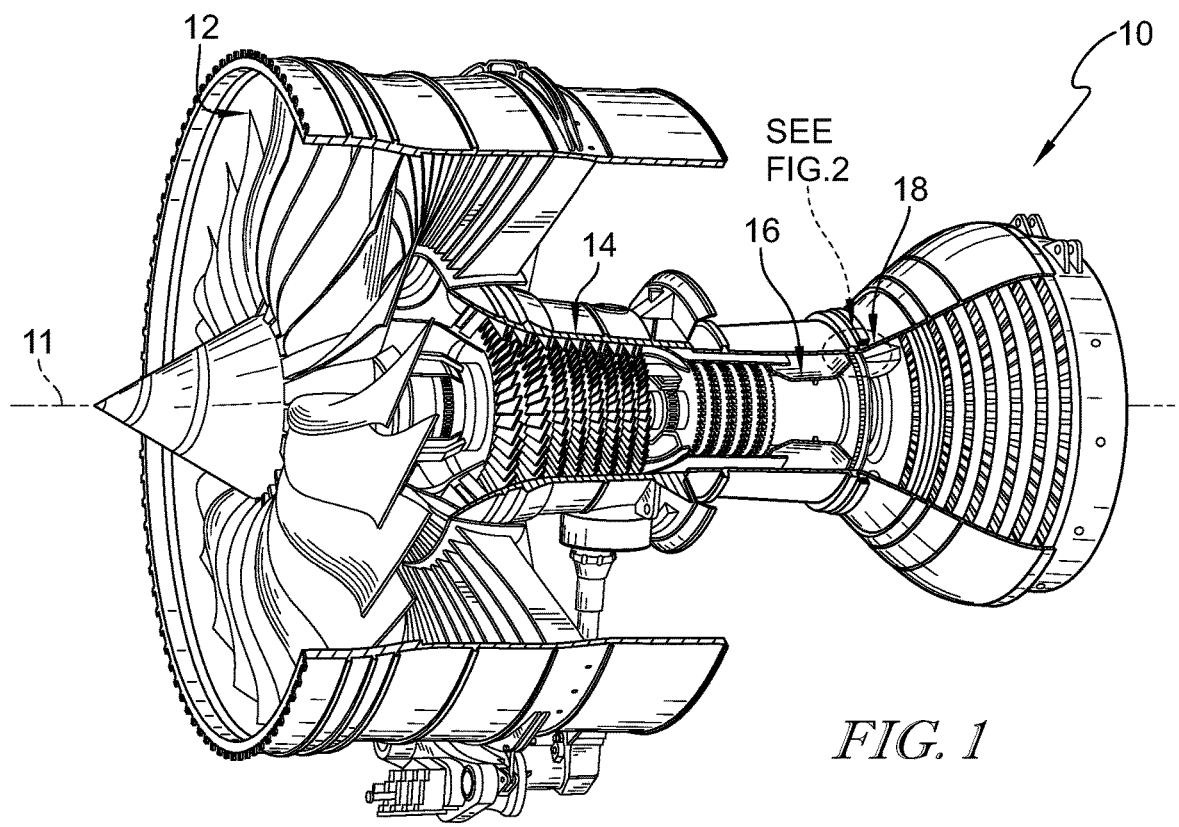
FIG. 1 is a cutaway view of a gas turbine engine that includes a fan, a compressor, a combustor, and a turbine that includes a plurality of turbine wheel assemblies in accordance with the present disclosure that are adapted to extract work from hot combustion products received from the combustor.

For the purposes of promoting an understanding of the principles of the disclosure, reference will now be made to a number of illustrative embodiments illustrated in the drawings and specific language will be used to describe the same.

Figure 2:
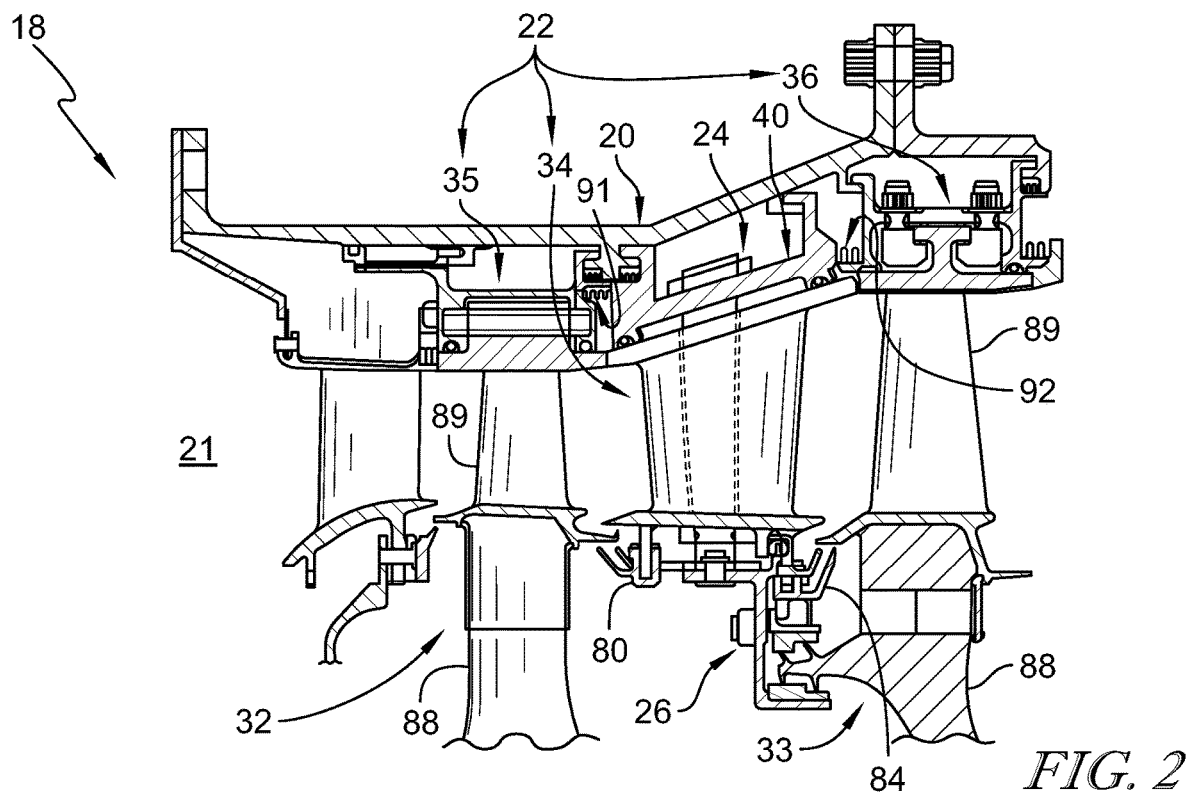
FIG. 2 is a cross sectional view of a portion of the turbine section of the gas turbine engine of FIG. 1 showing that the turbine section includes a turbine case, a plurality of gas path components, a vane mount unit, and an inner vane static seal assembly.

A turbine section 18 according to the present disclosure is adapted for use in a gas turbine engine 10 as suggested in FIGS. 1 and 2. The gas turbine engine 10 includes a fan 12, a compressor 14, a combustor 16, and a turbine 18. The fan 12 generates thrust for propelling an aircraft. The compressor 14 compresses and delivers air to the combustor 16. The combustor 16 mixes fuel with the compressed air received from the compressor 14 and ignites the fuel. The hot, high-pressure gases from the burning fuel are directed into the turbine 18 where the turbine 18 extracts work from the gases to drive the compressor 14 and the fan 12. In other embodiments, the gas turbine engine 10 may include a shaft, turboprop, or gearbox in place of the fan 12.

Figure 3:
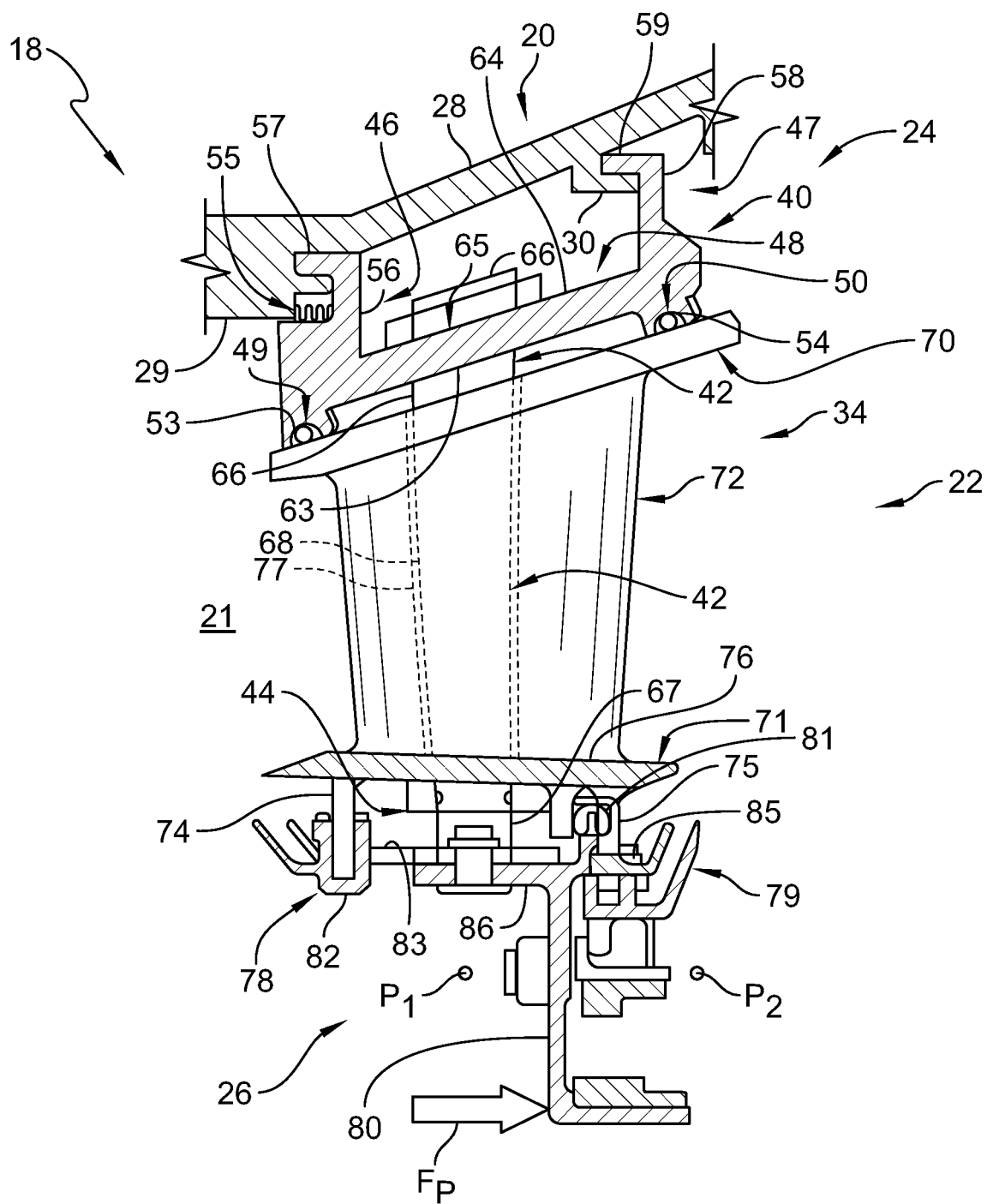
FIG. 3 is a detail view of the turbine section of FIG. 2 showing that the vane mount unit includes a carrier, a spar, and a clamp nut and showing that the carrier includes forward and aft hangers engaged with the turbine case.

The turbine section 18 includes a turbine case 20, a plurality of gas path components 22, a vane mount unit 24, and an inner vane static seal assembly 26 as shown in FIGS. 1-3. The turbine case 20 is arranged around the central axis 11 and encases the plurality of gas path components 22, the vane mount unit 24, and the inner vane static seal assembly 26. The plurality of gas path components 22 are configured to interact with the hot combustion gases from the combustor 16. The vane mount unit 24 couples the plurality of gas path components 22 to the turbine case 20. The inner vane static seal assembly 26 is located radially inward of the primary gas path 21 of the turbine section 18 and is coupled to the vane mount unit 24 so as to be coupled to the turbine case 20 via the vane mount unit 24.

The turbine case 20 includes an annular shell 28, a forward bracket 29, and an aft bracket 30 as shown in FIGS. 2 and 3. The annular shell 28 extends around the axis 11. The forward bracket 29 extends radially inward from the annular shell 28. The aft bracket 30 extends radially inward from the annular shell 28 at a location axially spaced from the forward bracket 29. The forward and aft brackets 29, 30 also extend circumferentially at least partway around the overall circumferential length of the annular shell 28. In the illustrative embodiment, the turbine case 20 only has two brackets 29, 30. In other embodiments, the turbine case 20 may include two or more brackets.

In the illustrative embodiment, the forward and aft brackets 29, 30 provide attachment features for the carrier 40 with a hook shape. In other embodiments, the aft attachment feature may be provided by a simple rail shape feature. In other embodiments, the forward and aft attachment features may have another suitable shape (dovetail interface, T-shape interface, or other suitable interface shape).

The plurality of gas path components 22 includes turbine wheels 32, 33, a turbine vane 34, and forward and aft seal rings 35, 36 as shown in FIGS. 2 and 3. Each turbine wheel 32, 33 is configured to interact with the hot combustion gases from the combustor 16 and rotate about a central axis 11 of the gas turbine engine 10 to generate power for driving the compressor 14 and/or the fan 12. The turbine vane 34 is configured to direct gases received from an upstream turbine wheel 32 toward a downstream turbine wheel 33. The turbine vane 34 is made from ceramic matrix composite components. The forward seal ring 35 is located axially forward of the turbine vane 34 and arranged around the first stage turbine wheel 32. The aft seal ring 36 is located axially aft of the turbine vane 34 and arranged around the second stage turbine wheel 33.

The vane mount unit 24 includes a carrier 40, a spar 42, and a clamp nut 44 as shown in FIG. 3. The spar 42 is made from metallic materials that extends radially through a vane cavity 77 formed in an airfoil 72 of the turbine vane 34. In some embodiments, the spar 42 may be hollow and include cooling holes to transmit cooling air to the vane 34 and/or into the inter-disk cavity between the turbine wheels 32, 33. The support spar 42 is configured to receive aerodynamic loads from the airfoil 72 during use of the turbine section 18 in the gas turbine engine 10 as well as transmit axial loading of the inner vane static seal assembly 26 to the casing 20. The carrier 40 is made from metallic materials and is coupled to the spar 42. The carrier 40 engages the turbine case 20 to carry axial loads from the inner vane static seal component 26, axial and/or circumferential loads from the vane, and aerodynamic loads from the spar 42 to the turbine case 20. The clamp nut 44 is located radially inward of an inner end wall 71 of the vane 34 and mates with the spar 42 to clamp the vane 34 blocking radial movement of the vane 34 relative to the axis 11.

In the illustrative embodiment, the clamp nut 44 radially retains the turbine vane 34 relative to the spar 42. In other embodiments, other methods to radially retain the turbine vane may be used, such as a pin, other fastener, or integrated manufacturing retention (casting, welding, etc.).

The carrier 40 includes forward and aft hangers 46, 47, a body panel 48, and a plurality of seal receivers 49, 50, as shown in FIG. 3. The forward hanger 46 extends radially outward from the carrier body panel 48 at a forward end of the turbine vane 34 and is engaged with the forward bracket 29 of the turbine case 20. The aft hanger 47 extends radially outward form the carrier body panel 48 at an aft end of the turbine vane 34 and is engaged with the aft bracket 30 of the turbine case 20 so that the vane mount unit 24 contacts the turbine case 20 at two axially spaced apart locations. The vane mount unit 24 contacts the turbine case 20 at two axially spaced apart locations to transfer aerodynamic loads to the turbine case 20 at axially spaced apart locations thereby anchoring the turbine vane 34 relative to the turbine case 20 during use of the turbine section 18 in the gas turbine engine 10. The body panel 48 extends between and interconnects the forward hanger 46 and the aft hanger 47 and engages the turbine vane 34. The spar 42 couples to the body panel 48 of the carrier 40 in between the forward and aft hangers 46, 47. The seal receivers 49, 50 are provided by radially-inwardly facing channels formed in the carrier and open radially inward toward the turbine vane 34.

In the illustrative embodiment, the body panel 48 of the carrier 40 extends circumferentially at least partway around the axis 11. Multiple carrier 40 segments are installed around the axis 11 and engaged the forward and aft bracks 29, 30 of the turbine case 20. In other embodiments, the body panel 48 of the carrier 40 may be a hoop that extends around the axis 11.

In the illustrative embodiment, a single turbine vane 34 installed per carrier 40. In other embodiments, two or more turbine vanes 34 may be installed per carrier 40 so that the carrier body panel 48 of each carrier 40 engages two or more turbine vanes 34. In other embodiments, the turbine vanes 34 are installed around the hoop of the carrier 40.

In the illustrative embodiment, plurality of seal receivers 49, 50 include a forward seal receiver 49 and an aft seal receiver 50 as shown in FIG. 3. The seals 53, 54 are held in place by the forward and aft seal receivers 49, 50. The seals 53, 54 seal an interface between the carrier 40 and an outer end wall 70 of the turbine vane 34. In the illustrative embodiment, the seals 53, 54 are strip seals. In other embodiment, the seals 53, 54 may be any other suitable seal.

In the illustrative embodiment, the carrier 40 has two hangers 46, 47. In other embodiments, the carrier 40 may include two or more hangers to couple to the turbine case 20.

In the illustrative embodiment, the forward and aft hangers 46, 47 extend circumferentially at least half way along an overall circumferential length of the carrier 40. The forward and aft hangers 46, 47 extend circumferentially along the circumferential length of the carrier 40 to anchor the carrier 40 to the turbine case 20 at the forward and aft brackets 29, 30 in the circumferential direction at the two axial locations. The forward and aft hangers 46, 47 contact the forward and aft brackets 29, 30 circumferentially to transfer circumferential aerodynamic loads to the turbine case 20.

The forward hanger 46 includes a radially extending portion 56 and an axially extending section 57 as shown in FIG. 3. The radially extending portion 56 extends radially outward and away from the body panel 48 of the carrier 40. The axially extending section 57 extends axially forward and away from the radially extending portion 56 such that the forward hanger 46 provides an L-shape when viewed circumferentially around the central reference axis 11.

The aft hanger 47 also includes a radially extending portion 58 and an axially extending section 59 as shown in FIG. 3. The radially extending portion 58 extends radially outward and away from the body panel 48 of the carrier 40. The axially extending section 59 extends axially forward and away from the radially extending portion 58 such that the aft hanger 47 provides an L-shape when viewed circumferentially around the central reference axis 11.

The carrier body panel 48 includes radial inner surface 63, a radial outer surface 64, and a spar cavity 65 as shown in FIG. 3. The radially inner surface 63 faces the outer end wall 70 of the vane 34. The radially outer surface 64 is space apart from the radially inner surface 63 and faces the turbine case 20. The spar cavity 65 extends radially through the inner and outer surfaces 63, 64 and receives the support spar 42 so that the spar 42 is coupled to the carrier 40.

In the illustrative embodiment, the spar 42 is spaced apart from the airfoil 72 of the turbine vane 34 at all radial locations along the primary gas path 21 so as to establish a gap between the spar 42 and the vane cavity 77 of the airfoil 72 of the turbine vane 34. The gap between the spar 42 and the airfoil 72 may be used to conduct cooling air.

In the illustrative embodiment, the seals 53, 54 included in the vane mount unit 24 are configured to seal the interface between the outer end wall 70 of the vane 34 and the radially inner surface 63 of the of the carrier body panel 48. The seals 53, 54 also minimize the interface between the metallic materials of the carrier 40 and the ceramic matrix composite materials of the vane 34 therefore decreasing the chemical interaction between the two components.

The spar 42 includes a radial outer end 66, a radial inner end 67, and a body 68 as shown in FIG. 3. The radial outer end 66 extends through the spar cavity 65 and couples to the carrier 40 at the outer surface 64 of the carrier 40. The radial inner end 67 is radially spaced apart from the radial outer end 66 and extends past the inner end wall 71 of the vane 34. The clamp nut 44 couples to the radial inner end 67 of the spar 42. The body 68 extends between and interconnects the outer end 66 to the inner end 67 through the vane cavity 77. In the illustrative embodiment, the inner vane static seal assembly 34 couples to the radial inner end 67 of the spar 42 so as to be coupled to the turbine case 20 via the vane mount unit 24.

Turning again to the turbine vane 34, the turbine vane 34 includes an outer end wall 70, an inner end wall 71, and an airfoil 72 as shown in FIG. 3. The inner end wall 71 is spaced radially inward of the outer end wall 70. The airfoil 72 extends between and interconnects the outer end wall 70 and the inner end wall 71. The airfoil 72 is shaped to redirect air moving along a primary gas path 21 of the turbine section 18 that extends radially from the outer end wall 70 to the inner end wall 71. The airfoil 72 is also shaped to include a vane cavity 77 extending radially through the airfoil 72 and opens at the inner and outer walls 70, 71. The outer end wall 70 defines a radially outer boundary of the primary gas path 21 and the inner end wall 71 defines a radially inner boundary of the primary gas path 21. In the illustrative embodiment, the forward and aft seal rings define the radially outer boundary of the primary gas path 21 axially forward and axially aft of the airfoil 72.

In the illustrative embodiment, the outer end wall 70, inner end wall 71, and the airfoil 72 of the vane 34 are integrally formed from ceramic matrix composite materials such that the outer end wall 70, inner end wall 71, and the airfoil 72 are included in a one-piece vane component as shown in FIGS. 2 and 3. In other embodiments, the outer end wall 70, inner end wall 71, and the airfoil 72 may be formed as separate components.

The inner end wall 71 is formed to include a forward bracket 74, an aft bracket 75, and an inner end wall body panel 76 in FIG. 3. The forward bracket 74 extends radially inward from the inner end wall body panel 76 relative to the axis 11. The aft bracket 75 extends radially inward from the inner end wall body panel 76 at a location axially spaced from the forward bracket 74.

The inner vane static seal assembly 34 includes forward and aft gas path static seal components 78, 79, a secondary air turbine drum static seal component 80, and an inner vane seal 81 as shown in FIG. 3. The forward gas path static seal component 78 couples to the forward bracket 74 of the inner end wall 71 and faces the turbine wheel assembly 32 arranged axially forward of the turbine vane 34 to resist movement of gases out of the primary gas path 21. The aft gas path static seal component 79 couples to the aft bracket 75 of the inner end wall 71 and faces the turbine wheel assembly 33 arranged axially aft of the turbine vane 34 to resist movement of gases out of the primary gas path 21.

The inner vane seal 81 is located at the interface between the aft static seal component 79 and the aft bracket 75 of the inner end wall 71 to seal between the components. The secondary air turbine drum static seal component 80 extends radially inward from the aft gas path static seal component 79 and seals between axially adjacent turbine wheels 32, 33. The secondary air turbine drum static seal component 80 seals between the first stage turbine wheel 32 and the second stage turbine wheel 33 resulting in a first pressure P1 on the first stage turbine wheel 32 side and a second pressure P2 on the second stage turbine wheel 33 side.

In the illustrative embodiment, the first pressure P1 is greater than the second pressure P2 resulting in a difference of pressure on either side of the secondary static seal component 80. The difference of pressure causes a pressure force Fp to act on the secondary air turbine drum static seal component as shown in FIG. 3. The pressure force Fp results in an axial moment in the turbine vane assembly 34.

The forward gas path static seal component 78 includes a forward bracket contact portion 82 and a forward static seal body plate 83 as shown in FIG. 3. The forward bracket contact portion 82 extends axially forward of the body plate 83 and couples to the forward bracket 74 of the inner end wall 71 to seal the vane assembly 34 at the forward bracket 74. The body plate 83 extends axially aft toward the aft bracket 75 of the inner end wall 71. The body plate 83 is shaped to include a spar passageway 84 that receives a portion of the radial inner end 67 of the spar 42 to couple the spar 42 to the forward gas path static seal component 78. The aft gas path static seal component 79 includes an aft bracket contact portion 85 and an aft static seal body plate 86 as shown in FIG. 3. The aft bracket contact portion 85 extends axially forward of the body plate 86 and couples to the aft bracket 75 of the inner end wall 71 to seal the vane assembly 34 at the aft bracket 75. The body plate 86 extends axially forward toward the forward bracket 74 of the inner end wall 71. The body plate 86 is shaped to include a spar passageway 87 that receives another portion of the radial inner end 67 of the spar 42 to couple the spar 42 to the aft gas path static seal component 79.

In the illustrative embodiment, the forward bracket 74 of the vane 34 and the forward bracket contact portion 82 of the seal component 78 have a rail and hook arrangement. The forward bracket 74 of the vane is a rail shape extending from the inner end wall 71 of the vane 34 and the forward bracket contact portion 82 of the seal component 78 forms a hook shape to couple to the forward bracket 74. Similarly, the aft bracket 75 of the vane 34 is a rail shape extend from the inner end wall 71 of the vane 34 and the aft bracket contact portion 85 forms a hook shape that holds a seal 81 that contacts the aft bracket 75.

In other embodiments, the interface between the aft bracket 75 and the aft bracket contact portion 85 may be shaped like the forward bracket 74 and the forward bracket contact portion 82 interface and include an omega-style seal to allow for compliance between the inner vane static seal 26 and the ceramic vane 34. In other embodiments, the aft bracket 75 and the seal component 79 may be formed as a one-piece component. A seal would be included at the interface between the aft bracket 75 and the inner end wall 71 of the vane 34 to minimize the metal to ceramic interaction and allow for compliance. In other embodiments, the aft bracket 75 of the one-piece component may be entrenched into the ceramic inner end wall 71 with a seal to allow for small axial movement.

In the illustrative embodiment, the body plate 86 of the aft static seal component 79 and the body plate 83 of the forward static seal component 78 overlap, with the body plate 86 of the aft static seal component 79 located radially inward of the body plate 83 of the forward static seal component 78. The forward static seal component 78 and the aft static seal component 79 are arranged such that the spar passageway 84 aligns with the spar passageway 87.

In the illustrative embodiment, the radial inner end 67 of the spar 42 extends through the spar passageways 84, 87 and is coupled with the inner vane static seal assembly 26 to transfer the axial moment created by the pressure force Fp on the secondary air turbine drum static seal assembly 80. The axial moment is transferred through the spar 42 to the carrier 40. The carrier 40 transfers the axial moment along with the aerodynamic loads to the turbine case 20.

Turning again to the turbine wheels 32, 33, each of the plurality of turbine wheels 32, 33 includes a disk 88 and a plurality of blades 89 as shown in FIG. 2. The disk 88 is coupled to a shaft of the engine 10 and is configured to rotate the shaft about the axis 11 during operation of the engine 10 to generate power. The blades 89 extend radially outwardly form the disk 88 away from the central axis 11 into the primary gas path 21 and are shaped to interact with and be rotated by the hot gasses that move axially along the primary gas path 21 of the engine 10.

In the illustrative embodiment, the forward seal ring 35 is arranged around the blades 89 of the turbine wheel 32 and controls a gap between the tip of the blades 89 and the seal ring 35. The aft seal ring 36 is arranged around the blades 89 of the turbine wheel 33 and controls a gap between the tip of the blades 89 and the seal ring 36.

In the illustrative embodiment, the forward bracket contact portion 82 of the forward gas path static seal component 78 cooperates with a portion of the disk 88 of the first stage turbine wheel 33 as shown in FIG. 2. The forward bracket contact portion 82 and the portion of the disk 88 cooperate to seal the gaps between the first stage turbine wheel assembly 32 and the turbine vane assembly 34.

In the illustrative embodiment, the aft bracket contact portion 85 of the aft gas path static seal component 79 cooperates with a portion of the disk 88 of the second stage turbine wheel 33 as shown in FIG. 2. The aft bracket contact portion 85 and the portion of the disk 88 cooperate to seal the gaps between the second stage turbine wheel assembly 33 and the turbine vane assembly 34.

In the illustrative embodiment, the turbine section 18 further includes a plurality of interstage w-seals 91, 92 as shown in FIG. 2. The interstage w-seal 91 seals between the turbine wheel assembly 32 and the carrier 40. The interstage w-seal 92 seals between the turbine wheel assembly 33 and the carrier 40. The interstange w-seals 91, 92 also eliminate the interaction between the metallic carrier 40 and the ceramic matrix composite material components of the seal rings 35, 36.

The present disclosure teaches transferring of second stage high pressure nozzle guide vane (HP2 NGV) loading to an intermediate metallic carrier prior to high-pressure turbine casing. The transfer of loading at a location before the turbine case reduces the complexity of the casing integration and alleviates challenging outer platform seal arrangements.

In metallic nozzle guide vane embodiments, the load from the HP2 NGVs is transmitted outboard to the high-pressure turbine casing. In metallic embodiments, the nozzle guide vane (NGV) structure is supported on hooks and/or rails attached to the outer platform. However, such an arrangement does not work for structures manufactured from the lower strength SiC/SiC ceramic matrix composite (CMC) materials.

The present disclosure teaches a nozzle guide vane arrangement to transfer the aerodynamic loading at both the inner and outer extents of the vane. The load would typically transmit through a metallic structure or spar out into the casing. In some embodiments, the spar may be integrated directly to the high-pressure turbine casing; however, the joint between the spar and the casing would be complex.

The present disclosure teaches a nozzle guide vane arrangement that minimizes the deflection of the metallic structure to avoid opening gaps at the CMC vane to blade interfaces. Gaps between the ceramic matrix composite vanes and the blades would increase leakage of the working fluid. Avoiding gaps at the vane to blade interfaces is challenging when considering the aerodynamic loading on the aerofoil and the stage loading applied to the inter-stage seal. Thus, to minimize the deflection, the axial length of the spar and the radial engagement between the spar and casing should be maximized.

In the illustrative embodiment, the spar is joined to a metallic carrier and the carrier is then attached to the casing. By joining the spar to the carrier, the length of the spar is minimized, reducing the deflection. The size of the axial moment to react the load into the casing is increased, which allows the illustrative w-seal to be integrated between the two metallic carriers, eliminating the durability concern associated with the chemical interaction between the seal and the ceramic matrix composite material.

In the illustrative embodiment, the casing to spar deflection is reduced and the high temperature ceramic matrix composite to metal seal is eliminated. Additionally, the nozzle guide vane seal may also be eliminated. The complexity of the casing joints and space claim are also reduced, which may alleviate the requirement to drive an increase in casing radial size.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine section of a gas turbine engine comprising
a turbine case including an annular shell that extends around a central reference axis, a forward bracket that extends radially inward from the annular shell, and an aft bracket that extends radially inward from the annular shell at a location axially spaced from the forward bracket,
a turbine vane made from ceramic matrix composite materials, the turbine vane including an outer end wall, an inner end wall spaced radially inward of the outer end wall, and an airfoil shaped to redirect air moving along a primary gas path of the turbine section that extends radially from the outer end wall to the inner end wall, and a vane mount unit that couples the turbine vane to the turbine case, the vane mount unit including (i) a spar made from metallic materials that extends radially through the airfoil of the turbine vane and that is configured to receive aerodynamic loads from the airfoil during use of the turbine section in the gas turbine engine and (ii) a carrier made from metallic materials that is coupled to the spar and engages the turbine case to carry aerodynamic loads from the spar to the turbine case, wherein the carrier includes a forward hanger engaged with the forward bracket of the turbine case and an aft hanger engaged with the aft bracket of the turbine case so that the vane mount unit contacts the turbine case at two axially spaced apart locations to transfer aerodynamic loads to the turbine case at axially spaced apart locations thereby anchoring the turbine vane relative to the turbine case during use of the turbine section in the gas turbine engine, further comprising an inner vane static seal assembly located radially inward of the primary gas path of the turbine section and spaced apart from the inner end wall of the turbine vane, wherein the inner vane static seal assembly is coupled to a radially-inner end of the spar so as to be coupled to the turbine case via the vane mount unit in such a way so as to transfer pressure forces applied to the inner vane static seal assembly through the vane mount unit and to the turbine case.

2. The turbine section of claim 1, wherein the inner vane static seal assembly includes a secondary air turbine drum static seal component that seals between axially-adjacent turbine wheels.

3. The turbine section of claim 2, wherein the inner vane static seal assembly includes a forward gas path static seal component that is faced by a turbine wheel assembly arranged axially forward of the turbine vane to resist the movement of gasses out of the primary gas path.

4. The turbine section of claim 1, wherein the forward hanger of the carrier included in the vane mount extends circumferentially at least half way along an overall circumferential length of the carrier, and wherein the aft hanger of the carrier included in the vane mount extends circumferentially at least half way along the overall circumferential length of the carrier.

5. The turbine section of claim 4, wherein the forward hanger includes a radially extending portion and an axially extending section such that the forward hanger provides an L-shape when viewed circumferentially around the central reference axis.

6. The turbine section of claim 1, wherein the spar is spaced apart from the airfoil of the turbine vane at all radial locations along the primary gas path so as to establish a gap between the spar and the airfoil of the turbine vane that may be used to conduct cooling air.

7. The turbine section of claim 1, wherein the carrier further includes a forward seal receiver and an aft seal receiver, and seals are held in place by the forward and aft seal receivers that seal an interface between the carrier and the outer end wall of the turbine vane.

8. The turbine section of claim 7, wherein the forward and aft seal receivers are provided by radially-inwardly facing channels formed in the carrier.

9. The turbine section of claim 1, wherein the carrier includes a carrier body panel that extends partway around the central reference axis, the forward hanger and the aft hanger extend radially outward from the carrier body panel away from the central reference axis, and the spar extends radially inwardly from the carrier body panel at a location axially between the forward hanger and the aft hanger.

10. A turbine section of a gas turbine engine comprising a turbine case that extends around a central reference axis, a turbine vane made from ceramic matrix composite materials, the turbine vane including an outer end wall, an inner end wall spaced radially inward of the outer end wall to define a primary gas path therebetween, and an airfoil that extends radially from the outer end wall to the inner end wall through the primary gas path, and a vane mount unit that couples the turbine vane to the turbine case, the vane mount unit including (i) a spar made from metallic materials that extends radially through the airfoil of the turbine vane and that is configured to receive loads from the airfoil during use of the turbine section in the gas turbine engine and (ii) a carrier made from metallic materials that is coupled to the spar and engages the turbine case at two axially separated locations to carry loads from the spar to the turbine case and anchor the turbine vane relative to the turbine case, further comprising an inner vane static seal assembly located radially inward of the primary gas path of the turbine section and spaced apart from the inner end wall of the turbine vane that is coupled to the spar so as to be coupled to the turbine case via the vane mount unit in order to transfer pressure forces from the inner vane static seal assembly through the vane mount unit to the turbine case.

11. The turbine section of claim 10, wherein the carrier includes a forward hanger engaged with the turbine case that extends circumferentially at least half way along an overall circumferential length of the carrier.

12. The turbine section of claim 11, wherein the forward hanger includes a radially extending portion and an axially extending section such that the forward hanger provides an L-shape when viewed circumferentially around the central reference axis.

13. The turbine section of claim 11, wherein the carrier includes an aft hanger engaged with the turbine case axially aft of the forward hanger, and the aft hanger extends circumferentially at least half way along an overall circumferential length of the carrier.

14. The turbine section of claim 13, wherein the aft hanger includes a radially extending portion and an axially extending section such that the aft hanger provides an L-shape when viewed circumferentially around the central reference axis.

15. The turbine section of claim 13, wherein the carrier includes a carrier body panel that extends partway around the central reference axis, the forward hanger extends radially outward from the carrier body panel, and the aft hanger extends radially outward of the carrier body panel at a location spaced axially from the forward hanger.

16. The turbine section of claim 15, wherein the spar is coupled to the carrier body panel and extends radially inwardly from the carrier body panel at a location axially between the forward hanger and the aft hanger.

17. The turbine section of claim 10, wherein the inner vane static seal assembly includes a secondary air turbine drum static seal component that seals between axially-adjacent turbine wheels.

18. The turbine section of claim 17, wherein the inner vane static seal assembly includes a gas path static seal component that is faced by a turbine wheel assembly arranged axially adjacent to the turbine vane to resist the movement of gasses out of the primary gas path.

* * * * *